(12) United States Patent
Kaufmann et al.

(10) Patent No.: US 9,457,308 B2
(45) Date of Patent: Oct. 4, 2016

(54) FILTER ELEMENT AND FILTER SYSTEM WITH A FILTER ELEMENT

(71) Applicant: MANN+HUMMEL GMBH, Ludwigsburg (DE)

(72) Inventors: Michael Kaufmann, Meckenheim (DE); Klaus-Dieter Ruhland, Meckenheim (DE)

(73) Assignee: MANN+HUMMEL GMBH, Ludwigsburg (DE)

( * ) Notice: Subject to any disclaimer, the term of this patent is extended or adjusted under 35 U.S.C. 154(b) by 68 days.

(21) Appl. No.: 14/474,236

(22) Filed: Sep. 1, 2014

(65) Prior Publication Data

US 2015/0059296 A1 Mar. 5, 2015

Related U.S. Application Data

(60) Provisional application No. 62/038,312, filed on Aug. 17, 2014, provisional application No. 62/038,575, filed on Aug. 18, 2014, provisional application No. 62/038,601, filed on Aug. 18, 2014, provisional (Continued)

(30) Foreign Application Priority Data

| Sep. 2, 2013 | (DE) | 10 2013 014 488 |
| Sep. 2, 2013 | (DE) | 10 2013 014 489 |
| Sep. 2, 2013 | (DE) | 10 2013 014 491 |
| Sep. 2, 2013 | (DE) | 10 2013 014 492 |
| Sep. 2, 2013 | (DE) | 10 2013 014 493 |
| Sep. 2, 2013 | (DE) | 10 2013 014 507 |

(51) Int. Cl.
*B01D 46/24* (2006.01)
*B01D 46/52* (2006.01)
(Continued)

(52) U.S. Cl.
CPC ....... *B01D 46/2411* (2013.01); *B01D 46/0001* (2013.01); *B01D 46/0002* (2013.01); *B01D 46/0004* (2013.01); *B01D 46/0021* (2013.01); *B01D 46/0027* (2013.01);
(Continued)

(58) Field of Classification Search
CPC .......... B01D 46/0004; B01D 46/0046; B01D 46/2411; B01D 46/2414; B01D 46/0001; B01D 46/521; F02M 35/02483; F02M 35/02416

See application file for complete search history.

(56) References Cited

U.S. PATENT DOCUMENTS

| 4,261,710 A | 4/1981 | Sullivan |
| 4,720,292 A | 1/1988 | Engel et al. |

(Continued)

FOREIGN PATENT DOCUMENTS

| DE | 202005001693 U1 | 6/2006 |
| DE | 102008062954 A1 | 7/2010 |

(Continued)

*Primary Examiner* — Robert Clemente
(74) *Attorney, Agent, or Firm* — James Hasselbeck

(57) ABSTRACT

A filter element has a filter body having a longitudinal axis, wherein the filter body has a first end with a first end face and a second end with a second end face opposite the first end in direction of the longitudinal axis. The filter body is provided with inner and outer circumferential surfaces permeable for a medium to be filtered. A first end disk is arranged at the first end face and a second end disk is arranged at the second end face. The outer circumferential surface of the filter body has at least one fluid-tight area that is impermeable for the medium to be filtered. The fluid-tight area is an incoming flow protector or an improper handling protector resting on the outer circumferential surface.

14 Claims, 5 Drawing Sheets

Related U.S. Application Data application No. 62/038,920, filed on Aug. 19, 2014, provisional application No. 62/038,672, filed on Aug. 18, 2014, provisional application No. 62/038,869, filed on Aug. 19, 2014.

(51) Int. Cl.

| | | |
|---|---|---|
| *B01D 46/00* | (2006.01) | |
| *F02M 35/024* | (2006.01) | |
| *F02M 35/02* | (2006.01) | |
| *F02M 35/022* | (2006.01) | |
| *F02M 35/09* | (2006.01) | |

(52) U.S. Cl.
CPC ..... *B01D 46/0046* (2013.01); *B01D 46/0086* (2013.01); *B01D 46/2414* (2013.01); *B01D 46/521* (2013.01); *F02M 35/0203* (2013.01); *F02M 35/024* (2013.01); *F02M 35/0216* (2013.01); *F02M 35/0223* (2013.01); *F02M 35/02416* (2013.01); *F02M 35/02483* (2013.01); *F02M 35/09* (2013.01); *Y10T 29/49826* (2015.01)

(56) References Cited

U.S. PATENT DOCUMENTS

| | | |
|---|---|---|
| 5,695,633 A | 12/1997 | Ernst et al. |
| 5,700,304 A | 12/1997 | Foo |
| 5,730,769 A | 3/1998 | Dungs et al. |
| 6,159,261 A | 12/2000 | Binder et al. |
| 7,090,708 B2 | 8/2006 | Winter et al. |
| 7,390,407 B2 | 6/2008 | Weindorf et al. |
| 8,061,530 B2 | 11/2011 | Kindkeppel et al. |
| 8,287,612 B2 | 10/2012 | Gillenberg et al. |
| 8,555,846 B2 | 10/2013 | Bode |
| 8,784,523 B2 | 7/2014 | Coulonvaux et al. |
| 8,790,431 B2 | 7/2014 | Muenkel et al. |
| 8,852,309 B2 | 10/2014 | Scott et al. |
| 2004/0065206 A1 | 4/2004 | Walker |
| 2004/0134171 A1* | 7/2004 | Scott ............... B01D 46/0001 55/482 |
| 2007/0163945 A1 | 7/2007 | Ehrenberg et al. |
| 2007/0240394 A1 | 10/2007 | Ehrenberg |
| 2009/0301042 A1* | 12/2009 | Troxell ............. B01D 46/2411 55/330 |
| 2010/0146920 A1* | 6/2010 | Iddings ............ B01D 46/0001 55/502 |
| 2012/0210683 A1 | 8/2012 | Gillenberg et al. |
| 2012/0266578 A1* | 10/2012 | Gorg ............... F02M 35/02425 55/492 |
| 2013/0086877 A1 | 4/2013 | Kori et al. |
| 2013/0232928 A1 | 9/2013 | Heim et al. |

FOREIGN PATENT DOCUMENTS

| | | |
|---|---|---|
| EP | 1128891 B1 | 9/2001 |
| WO | 2009146962 A1 | 12/2009 |

* cited by examiner

FILTER ELEMENT AND FILTER SYSTEM WITH A FILTER ELEMENT

CROSS-REFERENCE TO RELATED APPLICATIONS

This application claims the benefit of German patent application Nos. 10 2013 014 488.4, filed Sep. 2, 2013; 10 2013 014 489.2, filed Sep. 2, 2013; 10 2013 014 507.4, filed Sep. 2, 2013; 10 2013 014 492.2, filed Sep. 2, 2013; 10 2013 014 491.4, filed Sep. 2, 2013; and 10 2013 014 493.0, filed Sep. 2, 2013. The entire contents of the aforesaid German patent applications being incorporated herein by reference and to the fullest extent of the law.

This application claims the benefit of U.S. provisional patent application Nos. 62/038,312, filed: Aug. 17, 2014; 62/038,575, filed: Aug. 18, 2014; 62/038,601, filed: Aug. 18, 2014; 62/038,920, filed: Aug. 19, 2014; 62/038,672, filed: Aug. 18, 2014 and 62/038,869, filed Aug. 19, 2014. The entire contents of the aforesaid provisional patent applications being incorporated herein by reference and to the fullest extent of the law.

BACKGROUND OF THE INVENTION

The invention concerns a filter element, in particular for use as an air filter in an internal combustion engine, as well as a filter system for installation of such a filter element.

DE 297 80 439 U1 discloses air filter configurations in which the filter element and the housing are constructed such that a "pre-cleaning" process takes place that already removes coarse dirt from the air before the air is coming into contact with the filter element. For example, housings are constructed with respect to an incoming air stream such that the air is first guided in a circular flow or a screw pattern about the filter element (or so as to circumscribe it) so that coarse dirt particles or suspended particles are already separated from the air due to a cyclone effect.

In conventional systems, the incoming air causes considerable turbulence at the inlet opening into the system. Such turbulence can stress or weaken at this location the folds of the paper medium employed as a filter medium and this leads to weakening or sometimes even failure of the paper medium at this location. In some systems, the housing provides an inner structure in order to prevent this. Moreover, in the vicinity of the air inlet into the circular flow system, the air stream can be guided to a certain degree against the folded paper medium, in particular when the housing at this location has no protective structure. This can cause premature clogging of the filter medium at this location with coarse suspended particles. Moreover, the suspended particles can damage the medium when the particles are guided against the medium at this location.

According to DE 297 80 439 U1, the filter element therefore comprises a lining that provides a mechanical protection of the filter element, an area comprised of filter medium, and a shielding arrangement. The lining has open areas for passage of air. The shielding arrangement is arranged at a perforated or open part of the lining at a downstream surface in the direction of the air flow in such a position that it shields a connected part of the lining and a part of the filter medium from direct passage of air. The lining can be expanded metal lath and the shielding arrangement can be a polymer film or polymer foil.

The object of the invention is to provide a filter element with an incoming flow protector against direct incoming flow of a filter medium that can be produced efficiently and inexpensively.

A further object of the invention is to provide a filter system for receiving such an exchangeable filter element with an incoming flow protector that can be produced efficiently and inexpensively.

SUMMARY OF THE INVENTION

In accordance with the present invention, this is achieved according to one aspect of the invention in that the filter element has an outer circumferential surface of a filter body provided with at least one fluid-tight area that is impermeable for the medium to be filtered and formed as an incoming flow protector and/or improper handling protector. The invention further provides a filter system for receiving such a filter element.

A filter element is proposed that comprises a filter body with a longitudinal axis and inner and outer wall surfaces permeable for a medium to be filtered, in particular air, a first open or closed end disk arranged at a first end face and a second end disk that is arranged at the oppositely positioned end face. In this context, the outer circumferential surface of the filter body has at least one fluid-tight area that is impermeable for the medium to be filtered.

The term impermeable does not mean that a gas diffusion through the material is impossible but is to be understood such that the material is essentially a barrier for actual air flows in an air filter.

The filter element whose filter body, in accordance with its purpose, is permeable for the medium to be filtered and that is closed off at both ends by end disks, wherein one end disk, as usual, is impermeable for the medium to be filtered, is advantageously arranged such in a filter system that the medium to be filtered, for example dust-laden air, flows through an inlet into the housing and is guided tangentially past the filter element. Due to the tangential incoming flow at the filter element, the flow is caused to perform a rotational movement about the filter element, a so-called cyclone movement. In this cyclone preseparation, centrifugal forces, caused by the rotation of the flow, are acting on the possibly present coarse dirt particles in the air so that the coarse particles can be preseparated to a large degree. The area where the medium to be filtered impinges on the filter body is advantageously designed to be impermeable for the medium to be filtered so that the impinging medium is also deflected accordingly in tangential direction and is not guided partially into the filter body. Also, when this area is provided with a smooth surface, the flow resistance can be reduced for the medium to be filtered.

Moreover, with the arrangement according to the invention it is avoided that the filter medium, for example, paper, will be damaged by the impinging suspended particles or dust particles. Since the impinging flow can exhibit high speeds, eroding effects could otherwise be generated at the surface of the filter medium.

The axial expansion of the fluid-tight area can extend expediently at least a few millimeters past the area where the incoming medium impinges on the filter element. Preferably, the axial expansion can project by 5 mm to 10 mm past this area. Accordingly, the medium can thus be effectively affected across the entire width. At least the axial expansion of the fluid-tight area should extend past the width of the inlet by a few millimeters, preferably 5 mm to 10 mm. Also, the fluid-tight area is expediently directly arranged opposite the inlet at the outer circumferential surface of the filter element so that the incoming medium is fully affected. Moreover, the fluid-tight area as an incoming flow protector is expediently provided with a smooth surface in order to effect as much as possible a homogenous flow about the filter body as well as beneficial conditions for separation of the suspended particles or dust particles by means of the cyclone effect. This can be favorably affected by an embodiment with a smooth film that is placed about the filter body. A preferred material for the film is, for example, a polymer material of a thickness of 0.1 mm to 1.0 mm, for example, polypropylene or polyethylene.

It is further preferred that the incoming flow protector and/or the improper handling protector is designed to be self-supporting. Self-supporting means that the forces applied by a user during exchange of the filter element are absorbed and supported safely by the incoming flow protector and/or the improper handling protector so that there is no additional stabilizing, protective or supporting auxiliary structure surrounding the incoming flow protector and/or the improper handling protector externally nor is the incoming flow protector and/or the improper handling protector resting externally on such an auxiliary structure.

Advantageously, the area can be formed by an incoming flow protector and/or improper handling protector resting on the outer circumferential surface of the filter body. The area that is designed to be impermeable for the medium to be filtered can thus provide an incoming flow protector. In the prior art, this incoming flow protector is often referred to as a frame or filter frame and is often attached to the housing by injection molding or other connections as an additional plastic or sheet metal part extending about the filter body at a spacing thereto. According to the instant advantageous configuration, the fluid-tight area that serves as an incoming flow protector can however also serve as a improper handling protector depending on the installation position of the filter element. Since the filter medium, for example, paper, is often very sensitive with regard to touch or pressure, it is beneficial to provide an additional protector (improper handling protector: protector that prevents damage when handling the filter element for servicing, installation etc.) at least at some locations on the outer circumferential surface of the filter body by means of which the filter element can be held for mounting/demounting purposes.

In an expedient embodiment of the invention, the filter body can be provided at an axial end with an incoming flow protector and with an improper handling protector at the opposite end in axial direction. By means of this separate improper handling protector the filter element, when it is to be exchanged, can be removed from the filter housing and a new filter element can be inserted, wherein the incoming flow protector expediently is arranged directly opposite the inlet of the filter system on the outer circumferential surface of the filter body.

The axial expansion of the incoming flow protector should be selected such that it projects past the width of the inlet by a few millimeters, preferably 5 mm to 10 mm. Usually, this results in axial expansions of the incoming flow protector that are between 20% and 40% of the axial length of the filter element. Preferably, the axial expansion of the incoming flow protector for a filter element that is suitable for installation in a filter system of the invention is approximately e.g. 30% to 35% of precisely ⅓ of the total length of the filter element.

The axial expansion of the improper handling protector is to be expediently selected such that the filter element can be held safely by means of this improper handling protector, for example, the expansion is in a range of 100 mm to 150 mm. When both the incoming flow protector as well as the improper handling protector are provided, the total length of axial expansions of the incoming flow protector and the improper handling protector together should be selected such that between both films an area of preferably approximately the same length remains permeable for the filtered medium so that a sufficiently high filter action of the filter system is provided.

Advantageously, the incoming flow protector and/or the improper handling protector can be embedded in the end disk with an edge that adjoins the end disk. In this way, the incoming flow protector and/or the improper handling protector can be secured in a beneficial way on the outer circumferential surface of the filter body and can no longer move even in case of vibration excitation that frequently occurs in operation of the filter system. Also, the incoming flow protector is in this way automatically sealed by the end disk which may have a beneficial effect on the cyclone action because no bypass effects of the flow can occur. Also, the incoming flow protector and/or the improper handling protector can be produced monolithically together with the end disks, for example, injection molded which provides for an inexpensive production technology.

In a particularly beneficial embodiment of the invention, the edge of the incoming flow protector and/or of the improper handling protector that adjoins the end disks, respectively, can be provided with openings, for example, holes, teeth, grooves or similar structures; these openings are penetrated by the material of the end disk that is typically polyurethane foam or an elastomer so that a particularly intimate connection with the end disk as a result of the interlocking action can be effected.

Preferably, the openings are provided annularly arranged in circumferential direction in the incoming flow protector and/or improper handling protector and are regularly or irregularly spaced apart. Advantageously, the openings are completely introduced into the incoming flow protector and/or improper handling protector so that they do not open toward the edge embedded in the end disk. Only in this way is it possible to ensure a reliable form-fit connection. Moreover, advantageously the openings are provided only in the area of the incoming flow protector that is completely covered or surrounded by the end disk so that a reliable incoming flow protection is ensured because already small openings that can be flowed through may reduce the preseparation efficiency of the rotational preseparation process.

It is further preferred that the cross-section of incoming flow protector or improper handling protector is purely cylindrical (circular cylinder or oval cylinder, corresponding to the shape of the filter body). This means that not radial projections in outward or inward direction are provided either in the area of the end disks or at the end that is facing away from the respective end disk. A projection at the end that is facing away from the end disk could impair the circumferential flow; a projection at the end of the end disk facing away from the filter body would increase the stabilization but would be more difficult to produce and, since it adjoins the filter body axially, would increase the total length of the filter element without increasing the filter surface area.

Advantageously, the incoming flow protector and/or the improper handling protector can comprise a flexible film, in particular can be formed of a flexible film, that is applied onto the circumferential surface of the filter body. This so-called film frame can be provided with very thin walls and therefore can save construction space, primarily in comparison to a frame that is injection-molded onto the housing. In addition, this film frame can be produced in a simple way and a positive locking or form-fitting connection by means of the introduced perforations can be additionally realized between end disk and the film. Also, the film is flexible and tolerates slight deformations during transport or handling of the filter element without the film becoming damaged. In addition, it is possible to provide the film with printed text or images for marketing purposes. Also, the film can be designed to be transparent and can therefore enable viewing or checking on a dust removal process when cleaning the filter element for recycling purposes. On the other hand, the film can also be completely colored or dyed in order to effect a certain marking and/or (brand) recognition effect.

Expediently, the flexible film can be joined by means of ultrasonic welding (fusing) carried out in axial direction. Such a welding or fusing action is quick, inexpensive, and can be performed reliably. Also, the risk entailed in the context of a glue connection (contamination of the filter body by the adhesive) is thus avoided.

In an expedient embodiment, the filter body can be, for example, comprised of a filter bellows that is folded (pleated) in a zigzag shape and is of an annularly closed configuration. Folding can be done, for example, by means of knife pleating, for longer filter bodies, or rotary folding. The filter bellows can be comprised, for example, of paper or cellulose or a mixed fiber material of synthetic material and cellulose. The filter bellows can be designed to have a smooth surface, can be rolled and/or can have a surface that is embossed with patterns for reinforcement and/or for providing hollow spaces for dust deposition. The filter bellows can be provided with a coating and/or impregnation in order to make it moisture-resistant. Alternatively, it can also be coated with nanofibers. The filter body can also be structurally stiffened by a spiral wound glue strip. The use of these materials as filter media represents a very economic possibility for realizing such a filter element. At the same time, the described shape provides a stable arrangement so that a self-supporting configuration of the filter body and thus beneficial mounting properties are provided.

Expediently, the filter element can be an air filter, in particular an air filter of an internal combustion engine. Safe operation of internal combustion engines is also based on a safe and beneficial filtering of the intake air for the combustion. The described filter element provides an economic possibility for this purpose.

Advantageous is also the use of the filter element as a particulate filter, in particular a particulate filter of an internal combustion engine. Here, safe installation and economic replacement of the described filter element are also of decisive importance.

The invention concerns as a further aspect a filter system with a filter element according to the invention. The filter system comprises a housing which is substantially concentrically designed about a longitudinal axis; a cover closing off the housing and also concentrically designed about the longitudinal axis; an inlet provided on the housing and/or on the cover for supply of the medium to be filtered, in particular air; wherein on the housing concentric to the longitudinal axis an outlet for discharging the filtered medium is provided; wherein on the housing in the area of the outlet a sealing contour is provided which corresponds with a radial seal of the first end disk of the filter element; wherein the filter element is exchangeably arranged in the housing of the filter system.

The important advantage of such a filter system resides in the safe and stable installation of the filter element as well as a very economic replacement or exchangeability of the filter element in a service situation. In particular for a short service life, as in the field of agricultural and construction machinery, the fast exchangeability is of great importance.

In an advantageous arrangement, an incoming flow protector and/or improper handling protector can be arranged on an outer circumferential surface of the inserted filter element. In this way, the filter element, when exposed to the incoming flow of the medium to be filtered, is protected from damage of the filter medium by the dust particles. An improper handling protector enables mounting/demounting of the filter element in a simple way without damaging the filter element by touching or gripping it.

Advantageously, in the area of the inlet of the filter system a cyclone separator can be provided and on the housing or on the cover a dirt outlet can be provided. This cyclone separator is comprised of a guiding geometry that causes the medium to be filtered to rotate. Due to this rotation, the dirt is concentrated at the housing wall and is discharged at a suitable location through the dirt outlet. Due to the preseparation of most of the dirt from the air to be filtered, the service life of the actual filter element can be prolonged decisively.

According to a further embodiment of the invention, a secondary element can be arranged in the interior of the filter element. The secondary element that may be comprised of a support structure in a cylindrical configuration that is covered by means of a permeable filter medium, for example, a nonwoven, has the object to keep closed the outlet of the filter system upon exchange of the filter element so that no dirt can penetrate into this area while the filter element is cleaned or replaced. The secondary element that may be arranged concentric to the longitudinal axis of the filter system in the interior of the filter element is connected, for example, by a screw connection, with the housing and is provided with a seal relative to the housing.

Further expedient embodiments and advantages of the invention result from the claims, the description, and the drawing.

BRIEF DESCRIPTION OF THE DRAWING

Further embodiments and advantages can be taken from the following description. In the drawings, embodiments of the invention are illustrated. The drawings, the description, and the claims contain numerous features in combination. A person of skill in the art will consider the features expediently also individually and will combine them to further meaningful combinations.

In the Figures, same or functionally the same components are identified with same reference characters. The Figures show only exemplary embodiments and are not to be understood as limiting the invention.

DESCRIPTION OF THE PREFERRED EMBODIMENTS

Figure 1:
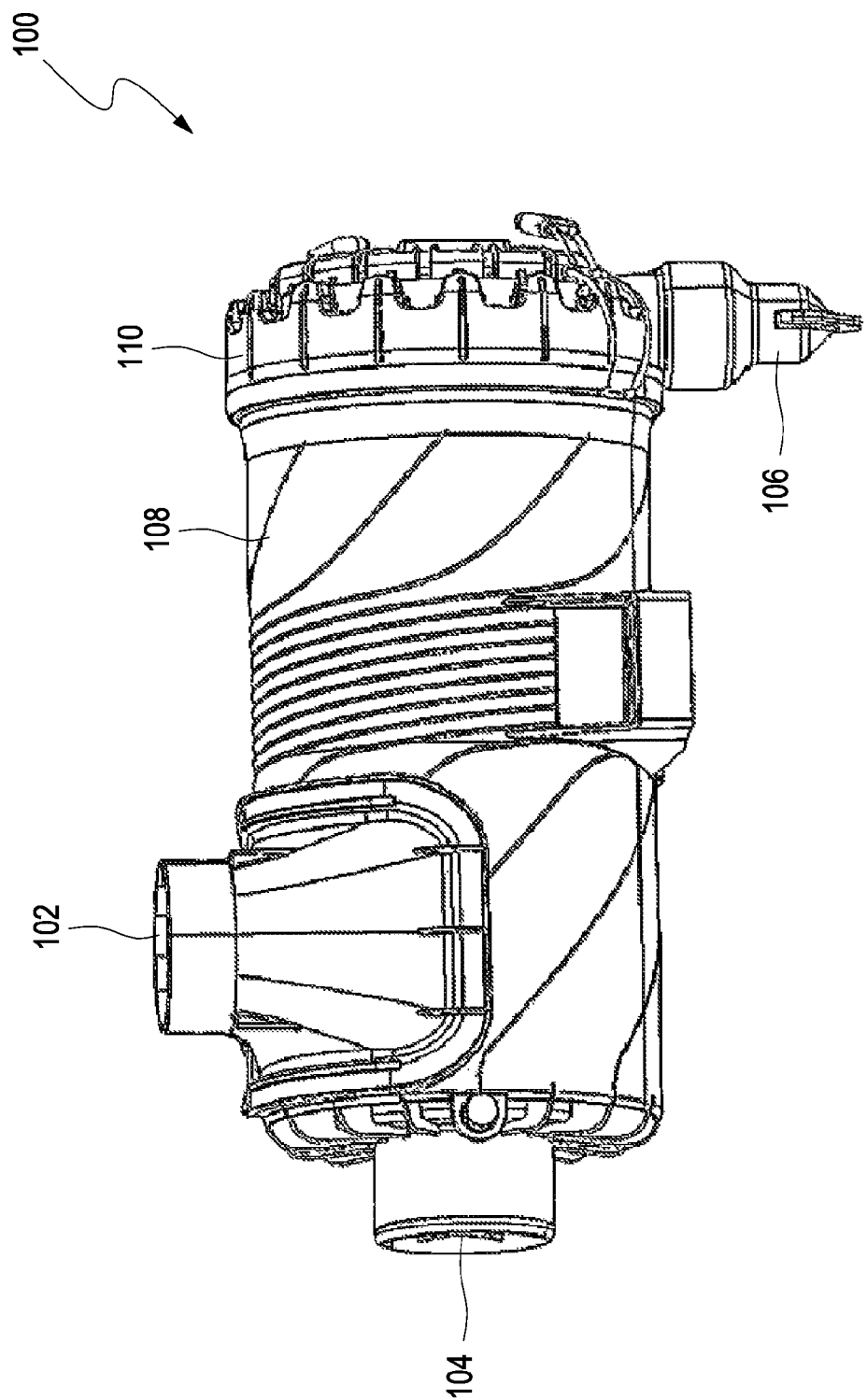
FIG. 1 shows in a perspective view a filter system according to an embodiment of the invention with tangential inlet, central outlet, and dirt outlet at the bottom.

FIG. 1 shows in a perspective view a filter system 100 according to an embodiment of the invention that, for example, can be used as an air filter of an internal combustion engine. The filter system 100 has a tangential inlet 102, a central outlet 104 at an end face of the housing, and a dirt outlet 106 at the bottom side of the housing. Illustrated is a round filter configuration comprised of housing 108 that is closed off by a cover 110 that is, for example, a screw closure or a bayonet coupling closure. When used as an air filter system, dust-laden air flows in through the inlet 102 that is arranged tangentially to the air filter element that is arranged in the interior so that the air in the interior of the housing 108 is caused to rotate due to the incoming flow protector provided at the filter element. Filter element and incoming flow protector are not illustrated in the drawing. Due to the cyclone effect that is caused by the rotational movement of the air, centrifugal forces are acting on the dirt particles of the incoming air so that the particles are partially separated at the housing wall and are discharged via the dirt outlet 106 from the filter system. In this way, the filter element is loaded less and the service life of the filter element is increased. The purified air can then be discharged via the central outlet 104 from the housing 108.

Figure 2:
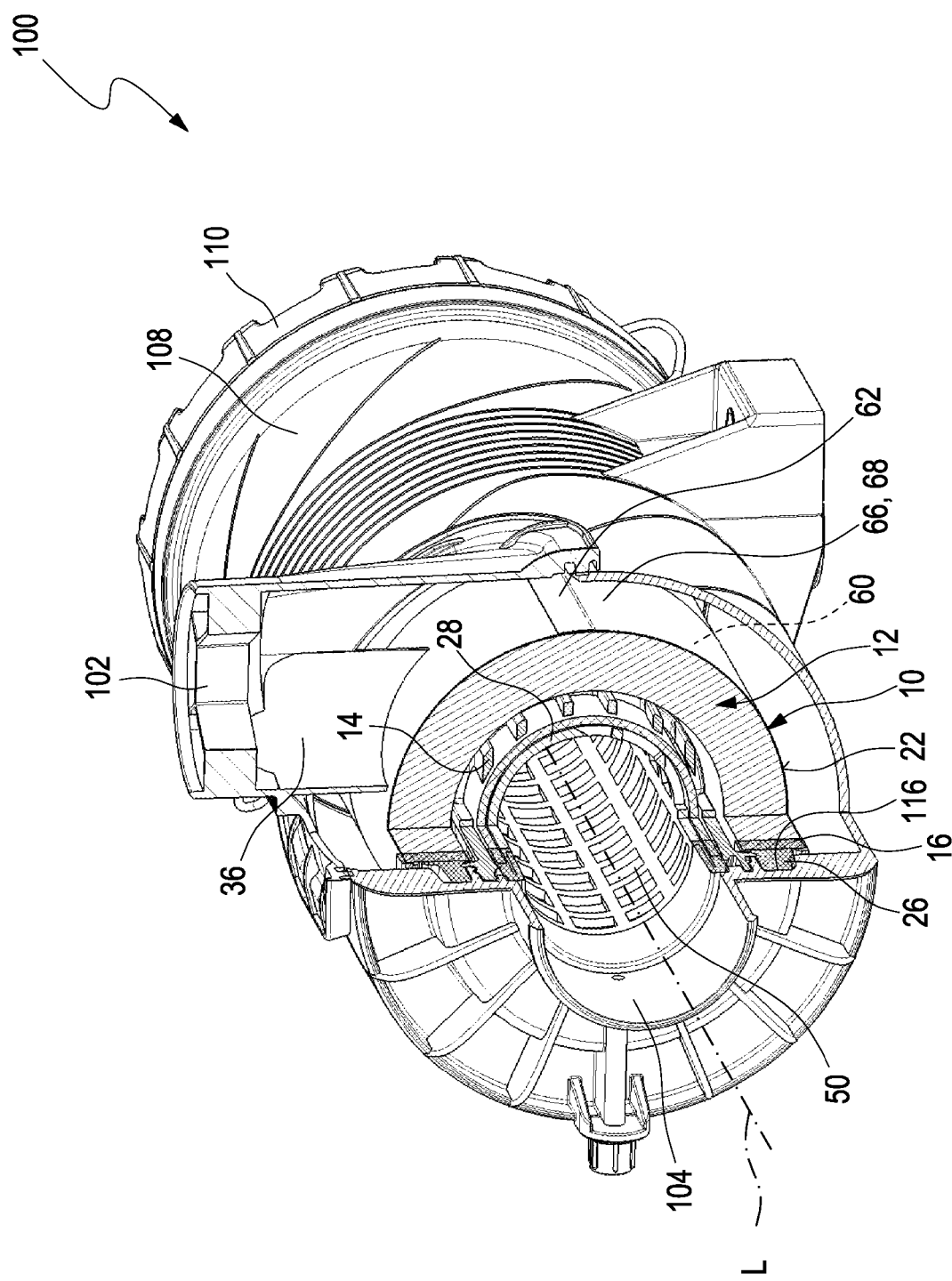
FIG. 2 shows in perspective view a filter system according to an embodiment of the invention with radial inlet and central outlet, the housing shown partially cut away and filter element also shown partially cut away.

In FIG. 2, a perspective view of a filter system 100 according to an embodiment of the invention with radial inlet 102 and central outlet 104 is illustrated. The housing 108 and the filter element 10 are shown partially cut away. In the partially cut-away housing 108, the filter element 10 is visible that is arranged concentrically along the longitudinal axis L within the housing. The filter element 10 that is illustrated with its partially cut-away filter body 12 has at the outer circumferential surface 22 of the filter body 12 a fluid-tight area 60 that is impermeable for the medium to be filtered and is comprised of a flexible film as an incoming flow protector 66 or improper handling protector 68. The axial expansion of the fluid-tight area 60 projects in this context expediently at least by a few millimeters, preferably 5 mm to 10 mm, past the area where the incoming medium impinges on the filter element 10 so that the incoming medium is effectively affected across the entire width. The axial expansion of the fluid-tight area should at least project past the width of the inlet 102 by a few millimeters, preferably 5 mm to 10 mm. Also, the fluid-tight area expediently is arranged directly opposite the inlet 102 on the outer circumferential surface 22 of the filter element 10 so that it affects the incoming medium fully.

The flexible film is joined by means of an ultrasonic weld 62 in axial direction. The filter element 10 is positioned in the housing 108 with a first end disk 16 acting as a radial seal 26 that corresponds with the sealing contour 116 of the housing 108. In the interior of the filter element 10, a support tube 14 for stiffening the housing 108 and supporting the filter element 10 as well as a secondary element 28 that closes off the outlet 104 dust-tightly when exchanging the filter element and that remains in the housing 108 are concentrically arranged. Support tube 14 and secondary element 28 are also shown partially cut away. At the end that is opposite the outlet 104, the housing 108 is closed off with a detachable cover 110 by means of which also an exchange of the filter element 10 can be carried out. The filter body 12 can have at the axial end an incoming flow protector 66 and at the opposite end in axial direction an improper handling protector 68.

The filter body 12 can be comprised, for example, of a zigzag-folded (pleated) filter bellows and can be annularly closed. The folding action can be carried out, for example, by knife pleating, for longer filter bodies 12, or rotary folding. The filter bellows can be comprised of a filter medium such as paper, cellulose, or a mixed fiber material of synthetic material and cellulose and can be provided with a smooth surface, with a rolled surface, and/or with a surface provided with different embossments for reinforcement and/or for providing hollow spaces for dust deposition. The filter bellows can be provided with a coating and/or impregnation in order to make it moisture-resistant. However, it can be coated alternatively with nanofibers. The filter body 12 can be structurally reinforced by a spiral wound glue strip.

Filter systems as illustrated in FIGS. 1 and 2 are usually employed in the field of construction machinery or agricultural machinery. They are characterized by great robustness and have a short service life because of their high dust load. A filter system with loaded filter element must be able to tolerate a weight increase of 10 kg or more.

Figure 3:
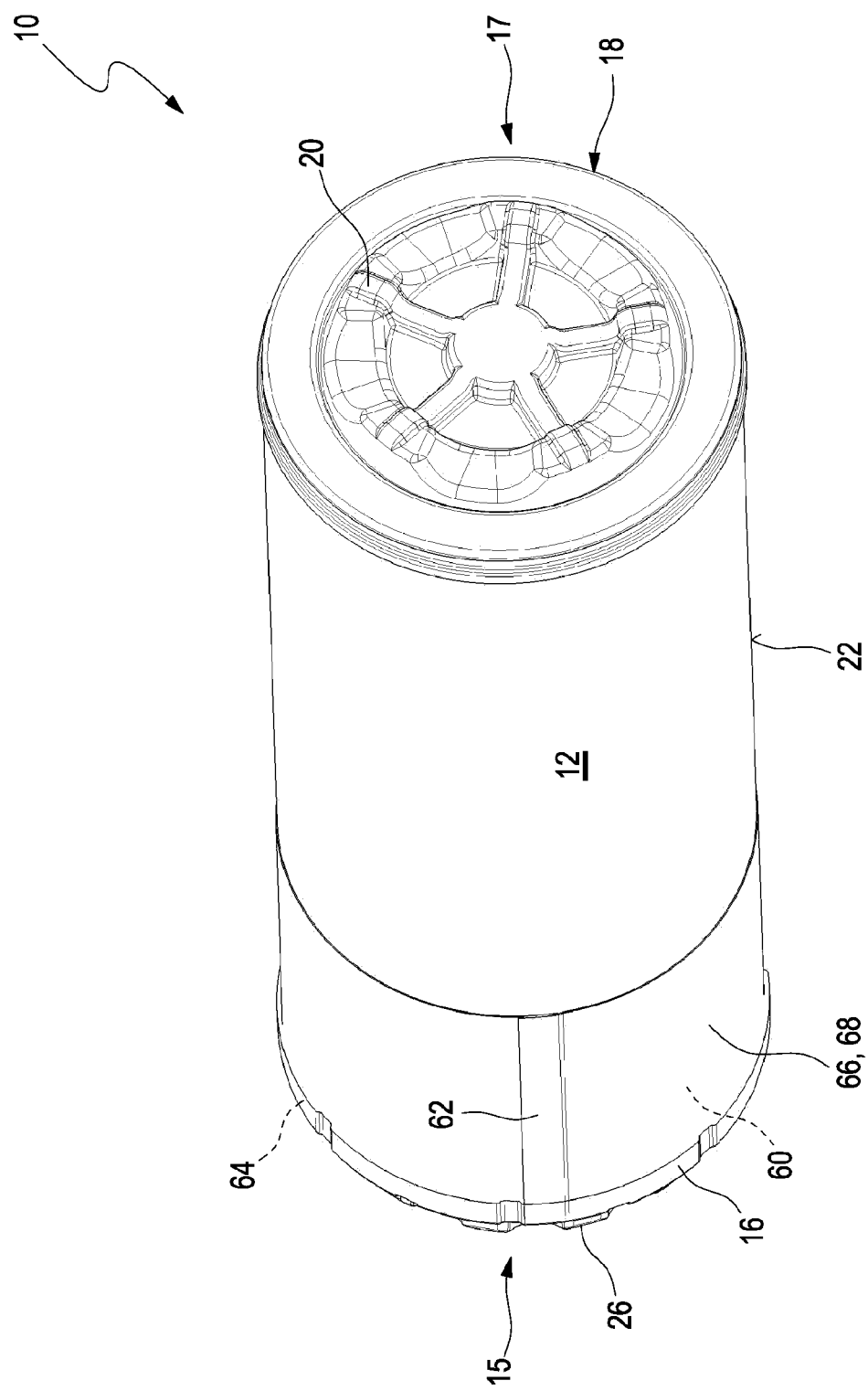
FIG. 3 shows a filter element with a flexible film as an incoming flow protector according to an embodiment of the invention.

FIG. 3 shows a filter element 10 in an area 60 that is designed to be impermeable for the medium to be filtered by providing a flexible film as an incoming flow protector 66 or improper handling protector 68 according to an embodiment of the invention. In the area 60 of the filter body 12, the film is applied to the outer circumferential surface 22 of the filter body 12 and is joined to an endless semi-finished product along a seam, for example, by means of an ultrasonic weld seam 62. At the upper end face 17 the filter element 10 is closed off with an end disk 18 that has support knobs 20 for effecting clamping in the housing after mounting of the cover. The lower end face 15 is closed off with an end disk 16 wherein the incoming flow protector 66 and/or the improper handling protector 68 is embedded in the end disk 16 with an edge that is adjoining the end disk 16. Embedding can be enhanced by openings 64 which are penetrated by the material of the end disk 16 and ensure additional interlocking.

Alternatively, the filter body 12 can also be provided at one end with a flexible film as an incoming flow protector 66 and at the other end can be provided with a flexible film as an improper handling protector 68. The incoming flow protector 66 is expediently directly arranged opposite the inlet 102 of the filter system 100 on the outer circumferential surface 22 of the filter body 12.

The axial expansion of the incoming flow protector 66 should be selected such that it projects past the width of the inlet 102 by a few millimeters, preferably 5 mm to 10 mm. The axial expansion of the improper handling protector 68 is expediently selected such that the filter element 10 at this improper handling protector 68 can be safely held; for example, an axial expansion in a range of 100 mm to 150 mm is provided. When the incoming flow protector 66 as well as the improper handling protector 68 are both provided on the filter element, the total length of the axial expansion of incoming flow protector 66 and improper handling protector 68 should be selected such that between both films an area of preferably substantially the same length remains permeable for the medium to be filtered so that a sufficiently high filter action of the filter system is provided.

Figure 4:
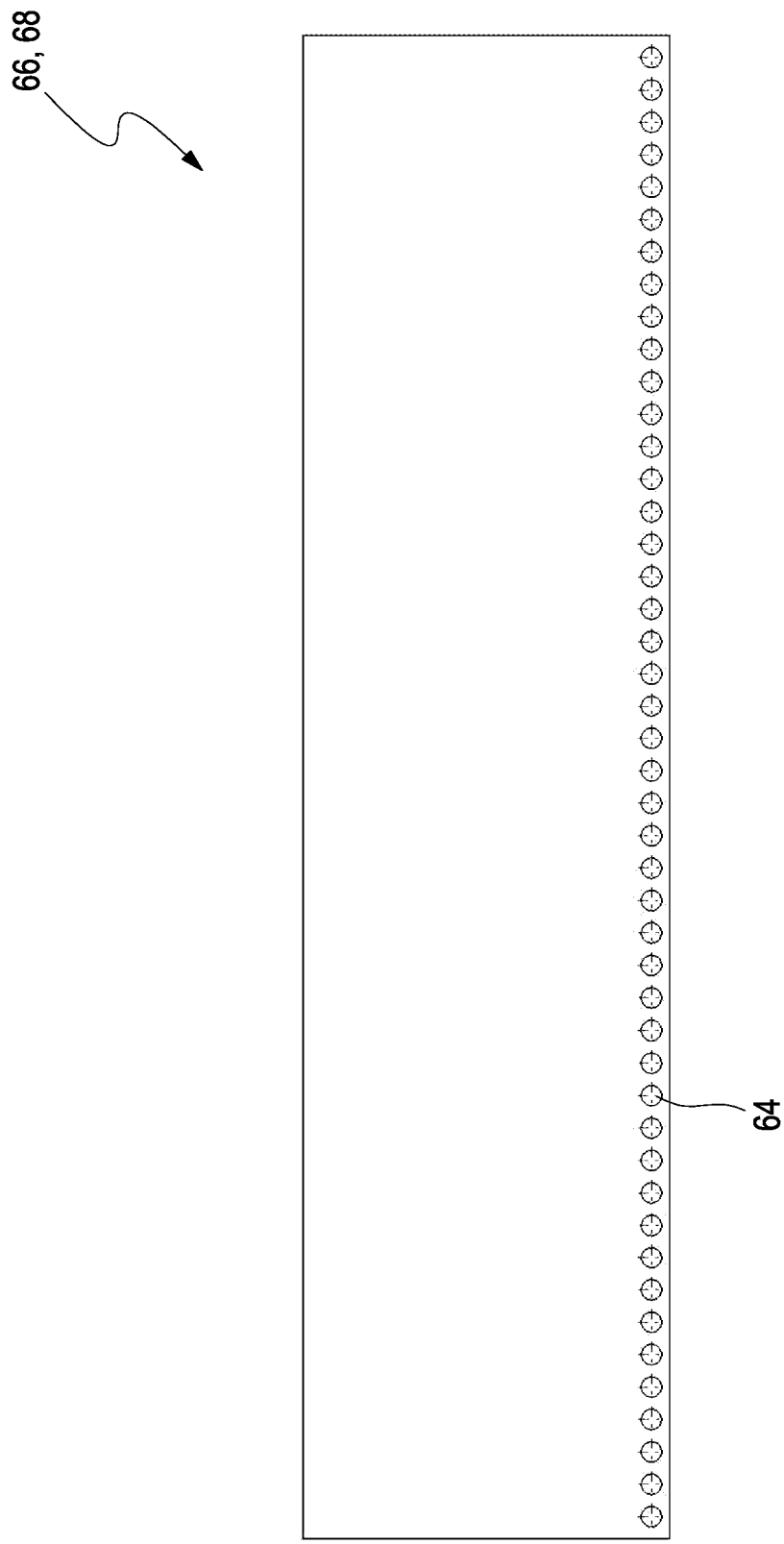
FIG. 4 shows a flexible film as a stamped semi-finished product according to an embodiment of the invention.

FIG. 4 illustrates a flexible film as a stamped semi-finished product that, according to an embodiment of the invention, can be designed as an incoming flow protector 66 and/or improper handling protector 68. The film can be, for example, cut to length from a band or web that is provided at one edge with stamped openings 64, for example, holes.

Figure 5:
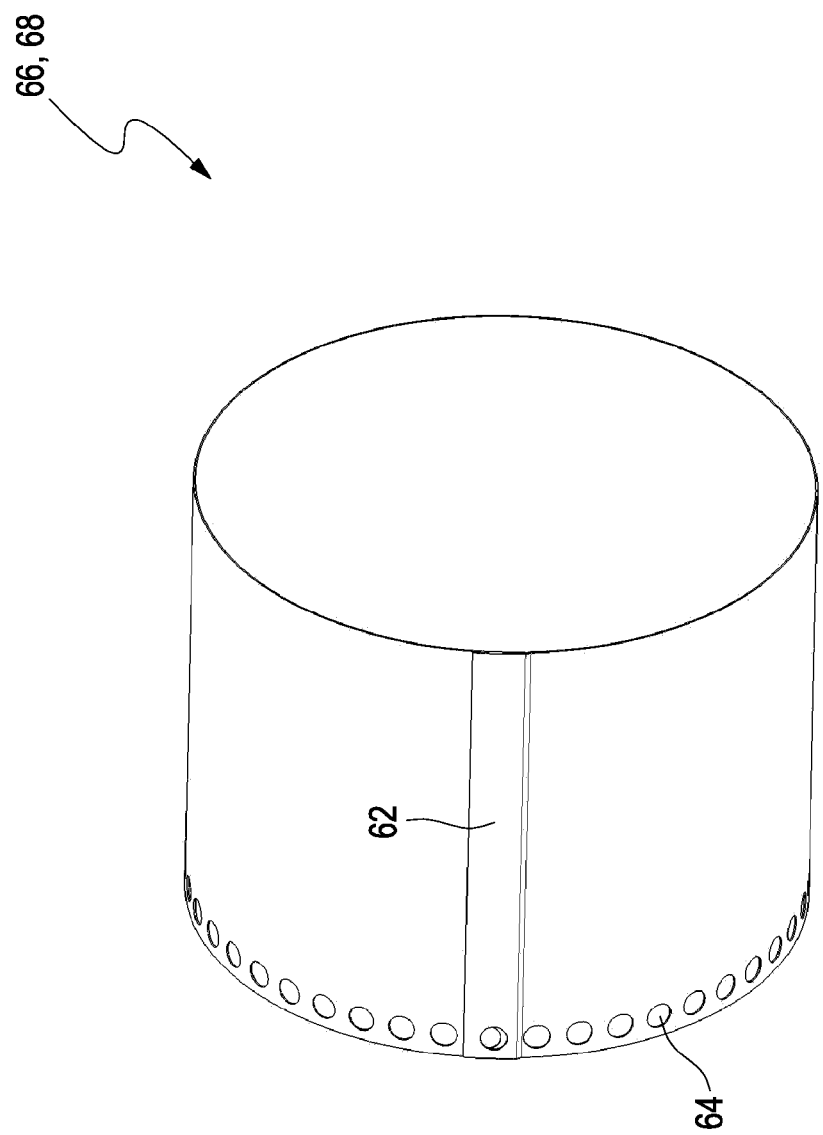
FIG. 5 shows a flexible film as a stamped semi-finished product that is welded to an endless configuration by ultrasonic welding in accordance with an embodiment of the invention.

FIG. 5 shows the flexible film of FIG. 4 as a stamped semi-finished product that, by ultrasonic welding, has been joined to an endless product according to one embodiment of the invention. The band or web that is illustrated in FIG. 4 can be wound, for example, about a cylindrical filter body and can then be joined along a seam in axial direction by means of an ultrasonic weld seam 62. The edge of the film that is provided with stamped openings 64 such as holes, after application of the film onto the filter body and welding of the seam 62, can be expediently embedded by injection-molding in an end disk of the filter body and can be safely interlocked by means of the stamped holes 64.

While specific embodiments of the invention have been shown and described in detail to illustrate the inventive principles, it will be understood that the invention may be embodied otherwise without departing from such principles.

What is claimed is:

1. A filter element comprising:
    a filter body having a longitudinal axis,
        wherein the filter body has a first end with a first end face and a second end with a second end face opposite the first end in direction of the longitudinal axis,
        wherein the filter body is provided with an inner circumferential surface and an outer circumferential surface that are permeable for a medium to be filtered;
    a first end disk arranged at the first end face;
    a second end disk arranged at the second end face;
    wherein the outer circumferential surface of the filter body has at least one fluid-tight area that is impermeable for the medium to be filtered;
    wherein the fluid-tight area is formed by an incoming flow protector and/or an improper handling protector resting on the outer circumferential surface;
    wherein the incoming flow protector and/or the improper handling protector comprises a flexible film applied onto the outer circumferential surface of the filter body.

2. The filter element according to claim 1, wherein the incoming flow protector is provided at the first end and the improper handling protector is provided at the second end.

3. The filter element according to claim 1, wherein an edge of the incoming flow protector and/or the improper handling protector adjoins the first end disk or the second end disk and is embedded in the first end disk or the second end disk.

4. The filter element according to claim 3, wherein the edge has openings which are penetrated by a material of the first end disk or a material of the second end disk.

5. The filter element according to claim 1, wherein the incoming flow protector and/or the improper handling protector is formed by a flexible film applied onto the outer circumferential surface of the filter body.

6. The filter element according to claim 1, wherein the flexible film is joined by an ultrasonic weld seam extending in the direction of the longitudinal axis.

7. The filter element according to claim 1, wherein the incoming flow protector and/or the improper handling protector is embodied to be self-supporting.

8. The filter element according to claim 1, wherein the filter body is folded in a zigzag shape, is of an annularly closed configuration, and is comprised of a filter medium that is selected from the group consisting of paper, cellulose, and a mixed fiber material of synthetic material and cellulose.

9. The filter element according to claim 1, embodied as an air filter.

10. The filter element according to claim 1, embodied as an air filter of an internal combustion engine.

11. A filter system comprising:
    a housing having a longitudinal axis and configured substantially concentric relative to the longitudinal axis;
    a filter element according to claim 1;
    a cover closing off the housing and concentrically configured relative to the longitudinal axis;
    an inlet provided on the housing and/or on the cover, wherein through the inlet a medium to be filtered is supplied;
    an outlet provided on the housing and arranged concentric to the longitudinal axis, wherein through the outlet a filtered medium is discharged;
    wherein on the housing in the area of the outlet a sealing contour is provided which corresponds with a radial seal of the first end disk of the filter element;
    wherein the filter element is exchangeably arranged in the housing of the filter system.

12. The filter system according to claim 11, further comprising a cyclone separator arranged in the area of the inlet and further comprising a dirt outlet arranged on the housing or on the cover.

13. The filter system according to claim 11, wherein the filter element has a secondary element arranged in an interior of the filter body.

14. The filter system according to claim 13, wherein the secondary element is connected with the housing and remains in the housing when the filter element is exchanged.

* * * * *